March 14, 1933.                C. H. BRADLEY                 1,901,549
                              SELF UNLOADING SHIP
                        Filed March 27, 1931         3 Sheets-Sheet 1
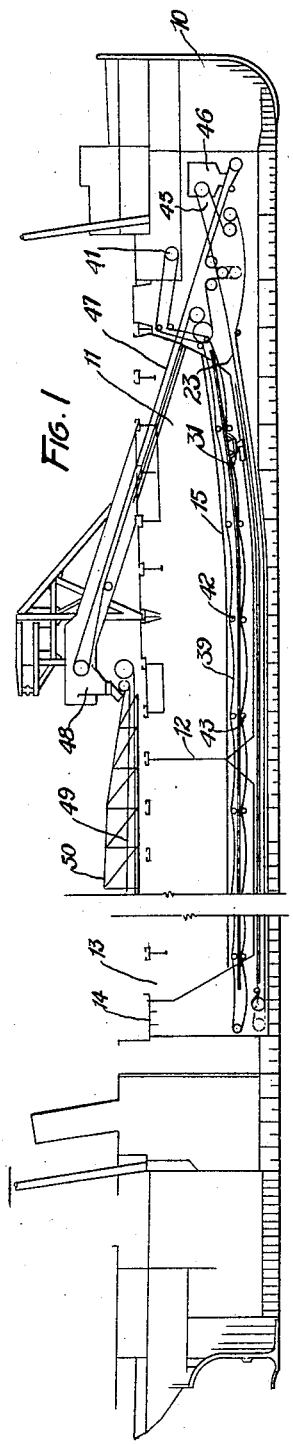
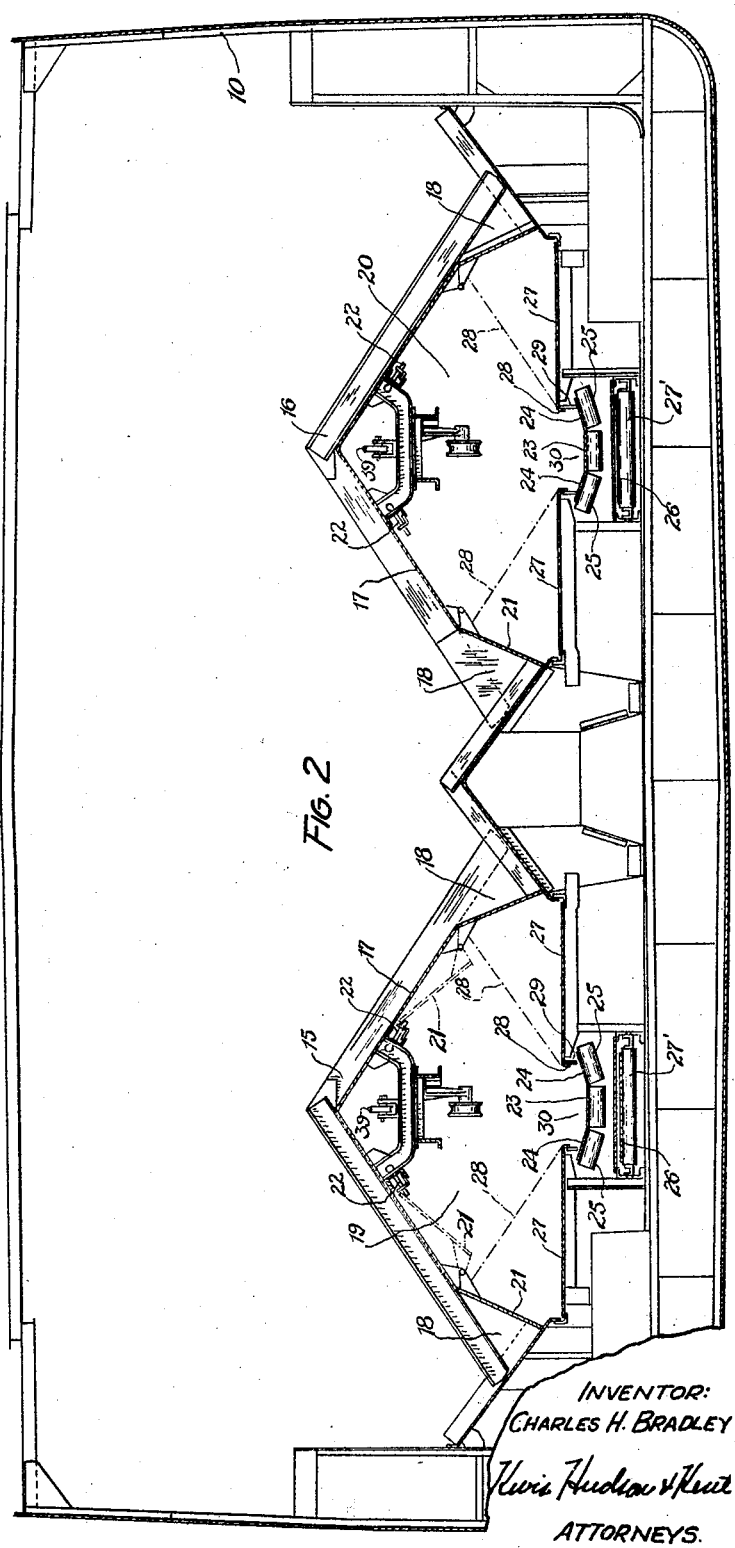
INVENTOR:
CHARLES H. BRADLEY
ATTORNEYS.

INVENTOR:
CHARLES H. BRADLEY
ATTORNEYS.

March 14, 1933. C. H. BRADLEY 1,901,549
SELF UNLOADING SHIP
Filed March 27, 1931 3 Sheets-Sheet 3

INVENTOR:
CHARLES H. BRADLEY
Kwis Hudson Kent
ATTORNEYS.

Patented Mar. 14, 1933

1,901,549

UNITED STATES PATENT OFFICE

CHARLES H. BRADLEY, OF UNIVERSITY HEIGHTS, OHIO, ASSIGNOR TO THE AMERICAN SHIP BUILDING COMPANY, OF CLEVELAND, OHIO, A CORPORATION OF NEW JERSEY

SELF-UNLOADING SHIP

Application filed March 27, 1931. Serial No. 525,788.

This invention relates to self-unloading vessels, and as its principal object aims to provide a bulk cargo carrying ship embodying novel and efficient unloading means whereby the cargo carried can be unloaded rapidly and with a minimum amount of breakage of the material.

It is also an object of this invention to provide a self-unloading ship, in which a conveyor extending longitudinally beneath a hopper bottom is loaded by discharging material onto supporting means extending adjacent the conveyor, and then transferring the material from the supporting means onto the conveyor.

Another object of this invention is to provide a self-unloading ship, in which a conveyor extending longitudinally beneath a hopper bottom is loaded by discharging material onto supporting means extending adjacent the conveyor, and then displacing the material onto the conveyor from the supporting means by causing a plow or the like to travel along the latter.

Another object of this invention is to provide a self-unloading ship of the type having a conveyor extending longitudinally beneath a hopper bottom, in which the means for feeding the material to the conveyor includes shelves or the like upon which material discharged through the hopper bottom is supported in substantially a condition of repose, and a device movable along said shelves for transferring the material from the latter to the conveyor.

A further object of this invention is to provide a self-unloading ship of the type having a conveyor extending longitudinally in a tunnel beneath a hopper bottom, in which material discharged upon the floor of the tunnel, on opposite sides of the conveyor, is transferred to the latter upon longitudinal movement of a transfer device in either direction in said tunnel.

Other objects and advantages of this invention will be apparent from the following description when taken in conjunction with the accompanying sheets of drawings, in which:

Figure 1 is a longitudinal sectional view of a self-unloading ship embodying my invention;

Fig. 2 is a transverse sectional view thereof;

Figure 3:
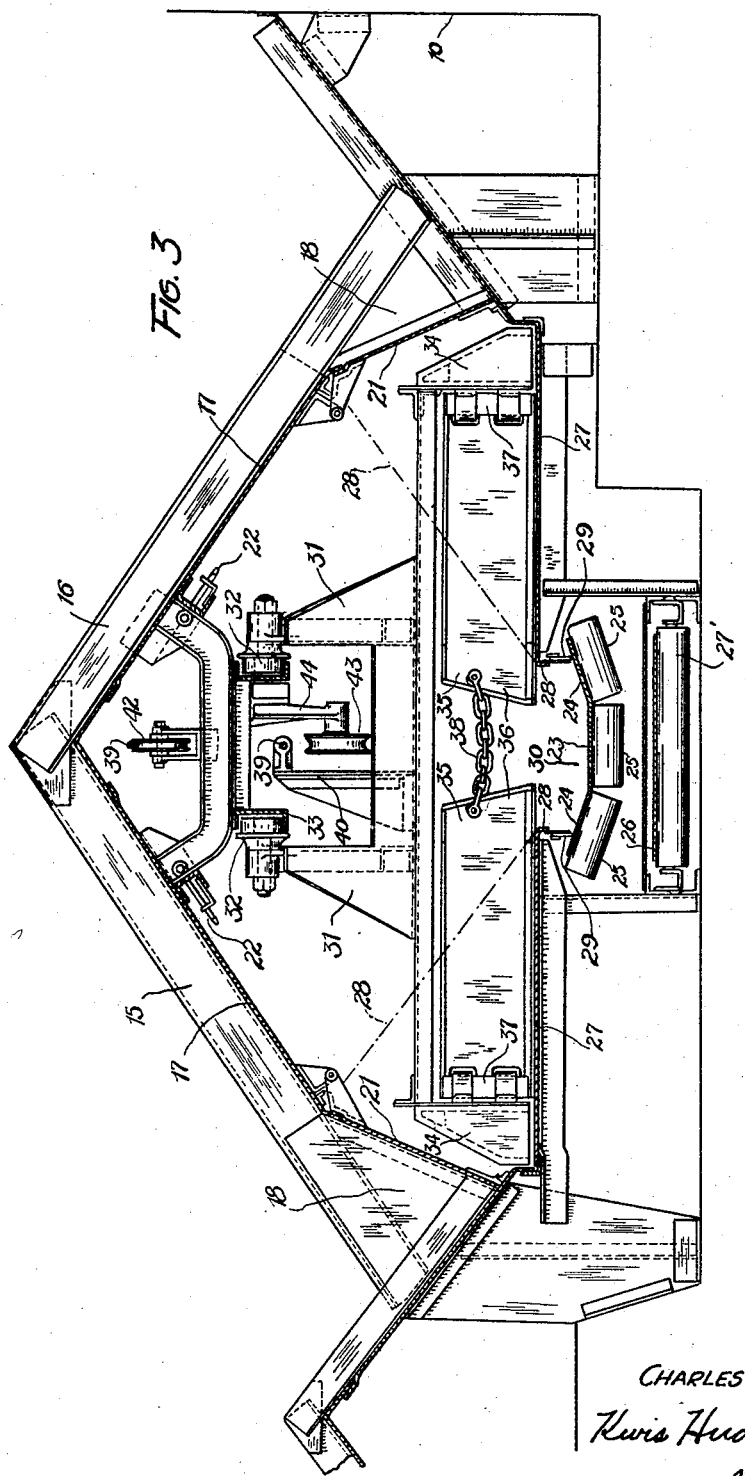
Fig. 3 is a partial transverse sectional view on an enlarged scale showing the conveyor loading means.

In the drawings, to which detailed reference will presently be made, I have shown a ship embodying the self-unloading means of my invention, whereby the bulk cargo carried by the ship can be unloaded rapidly and with minimum breakage of material. Before proceeding with this detailed description, it will be understood, of course, that my invention is not limited to the particular arrangement of structure illustrated, but that the principle thereof may be embodied in various self-unloading vessels.

The self-unloading means which I have provided is of the general type in which one or more endless main conveyors, extending longitudinally beneath the hopper bottom of the cargo hold, carry the material, preferably forwardly of the vessel, to a point beyond the hopper bottom where it is transferred to an elevating conveyor. This elevating conveyor lifts the material above the line of the main deck of the vessel, and delivers the same to the conveyor of a delivery boom, or the like, whereby it is discharged over the side of the vessel and deposited in a selected place. According to my invention, as will be presently explained, I employ novel means for loading the bulk cargo upon the main conveyors whereby unloading of the vessel can be carried on at a rapid rate and with minimum breakage of the material. Moreover, my self-unloading equipment, being of simplified form, does not materially reduce the cargo-carrying capacity of a vessel, nor greatly alter its center of gravity. This equipment may be incorporated in a new vessel as the same is being built, or may be installed in a previously built vessel without extensive alterations.

In Fig. 1 of the drawings, I have shown, somewhat diagrammatically, a bulk cargo carrying ship 10 having a longitudinally extending cargo hold 11 which may be divided into a series of separate holds or sections by one or more transverse bulkheads 12. These holds are provided with the usual series of filling hatch openings 13 extending through the main deck 14. As shown in Fig. 2 of the drawings, the bottom of the cargo space is of the hopper type, having two substantially parallel ridges 15 and 16 extending longitudinally of the vessel. The inclined sides 17 of these ridges form the bottom of the cargo hold, and are preferably disposed at such an angle that the bulk cargo being carried will readily slide downwardly by gravity into the substantially V-shaped valleys extending along opposite sides of the ridges.

For discharging the cargo through the hopper bottom, I provide a row of longitudinally spaced discharge pockets 18 in each of the inclined sides 17. As shown in the drawings, these pockets are located along the lower edges of the inclined sides 17, or, in other words, along the bottom of the substantially V-shaped valleys. These pockets have discharge openings which lead into the tunnels 19 and 20 extending longitudinally beneath the ridges 15 and 16, and which are normally closed by hinged doors 21. These doors are so arranged that they can be swung inwardly and upwardly in the tunnels to the open position indicated in dotted lines in Fig. 2, when the cargo is to be discharged from the hold. Suitable means may be provided for retaining the doors in the open position, such as the releasable latch pins 22.

As a means of carrying the material longitudinally of the tunnels to a point where it can be elevated above the main deck, I provide a suitable main conveyor 23 in each tunnel. In this instance, I have shown the main conveyors as being of the endless belt type in which the load-carrying portion 24 is supported in a trough-like condition by suitably spaced sets of rollers 25, and the return portion 26 is supported by a series of rollers 27'. Any suitable means may be employed for driving the conveyors, such as an auxiliary engine or an electric motor.

According to my invention, the material discharged from the hold through the pockets 18 does not fall directly upon the main conveyors 23, but is flooded or spilled upon supporting shelves 27, or the like, which extend longitudinally on both sides of each main conveyor. As shown in Figs. 2 and 3, these shelves are located somewhat above the level of the load carrying portions 24 of the main conveyors, with their longitudinally extending inner edges 28 overhanging those portions of the main conveyors. These shelves, furthermore, are so constructed that they present continuous and substantially smooth upper surfaces from which bulk material can be readily scraped or displayed onto the main conveyors by means presently to be described. To assist in retaining the material on the conveyor, the overhanging edges 28 are preferably provided with the depending, longitudinally extending guard plates 29. From the arrangement just described, it will be seen that the shelves form the tunnel floor, and that the space between the guard plates 29 and the adjacent edges of the shelves provides a longitudinally extending conveyor trough 30 having the load-carrying portion 24 of the conveyor belt for its bottom.

When material is discharged from the hold through the pockets 18 onto the shelves 27, this material assumes substantially a condition of repose in the form of sloping heaps represented by the dotted lines 28 shown in Fig. 2. These heaps extend in rows along opposite sides of the main conveyors corresponding in spacing and location with the gates that have been opened. For transferring the material from the supporting shelves to the main conveyors, I provide a transfer device in each tunnel which is adapted to be moved longitudinally therethrough and to scrape or displace the material from the shelves onto the main conveyor. For convenience in describing this transfer device, I shall refer to the same as a "plow", although it should be understood that I employ this term in its broader sense in which it means any device for moving or transferring material substantially laterally from one location to another.

This plow or transfer device is provided with a frame 31 having pairs of supporting rollers 32 adapted to travel along the spaced rails 33 which are supported in the gables of the tunnels. At each end of the transversely extending portion of the frame, I provide a deflecting shoe 34 and, upon movement of the plow, these shoes deflect the material away from the extreme outer edges of the shelves and toward the main conveyor. Deflecting plates 35 are arranged to extend toward the main conveyor from each of the shoes 34, and upon longitudinal movement of the plow within its tunnel, these plates scrape or deflect the material from the shelves onto the conveyor. These deflecting plates are preferably of sufficient length so that their adjacent ends 36 will overhang the conveyor extending somewhat beyond the edges 28.

Figure 4:
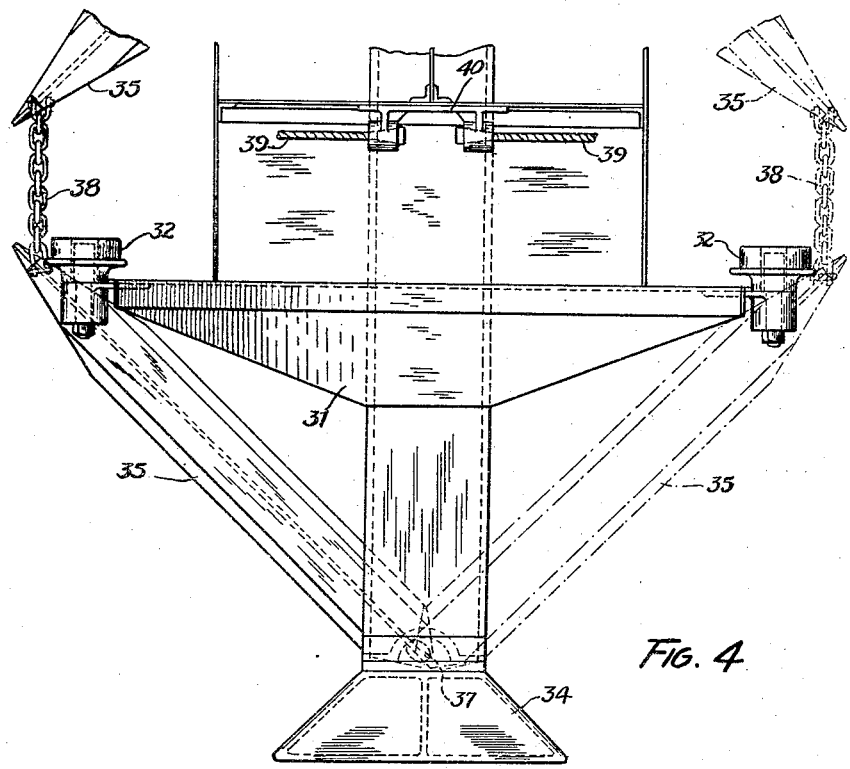
Fig. 4 is a partial top plan view of the plow or transfer device.
Figure 5:
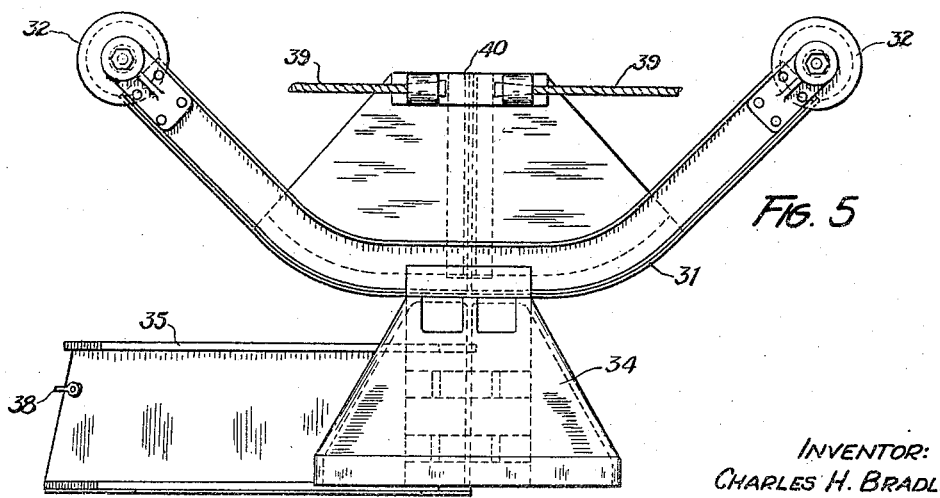
Fig. 5 is an elevational view thereof.

To enable the plow to function upon movement thereof in either direction through its tunnel, I provide a pivotal connection 37 between the deflecting plates 35 and the shoes 34, and also connect the adjacent ends of the plates by means of a link or connector of determined length, such as the chain 38. As the plow is moved longitudinally within the tunnel, the plates 35 assume an inclined position, as shown in Fig. 4, and are retained in this position so long as movement of the device continues in the same direction. When movement of the transfer device is started in the opposite direction through the tunnel, the deflecting plates swing about the pivotal connections 37 and assume an oppositely inclined position, as indicated in dotted lines in Fig. 4. Thus it will be seen that the transfer device is capable of transferring material to the main conveyor upon movement of the same in either direction through the tunnel. It will be understood, of course, that the angle of inclination of the deflecting plates will be determined by the length of the connector 38, and that this angle may be varied to suit different conditions of operation.

Motion may be imparted to the plows individually by any suitable means, such as the endless cable 39 to which the arm 40 of the plow frame 31 is secured. This cable may be actuated to draw the plow in either direction in its tunnel, by means of a drum 41 around which the cable is wrapped and which may be driven by a suitable reversible motor or engine. The cable may be supported by providing the sheaves 42 and 43 at suitably spaced points within the tunnel. It will be noted that the sheaves 43 are supported upon brackets 44 in such a manner that these sheaves will not interfere with the movement of the plow through its tunnel.

Each of the endless main conveyors is so arranged that its forward end 45 discharges the material being carried, into a suitable hopper 46. This hopper has a discharge opening positioned above the lower end of the inclined elevating conveyor 47 so that material delivered to the hopper by the main conveyors will be deposited upon the elevating conveyor. At the opposite end of the elevating conveyor, the material is delivered into a suitable hopper 48 from which it is discharged onto the conveyor 49 of the delivery boom 50. As is usual in apparatus of this kind, the delivery boom is adapted to be swung to either side of the vessel for depositing the material at a selected point.

It will now be readily understood that I have provided a novel form of self-unloading means for bulk cargo vessels having hopper-bottomed holds, wherein the material is supplied to or loaded upon a main conveyor by being first spilled or discharged upon shelves or supporting means extending adjacent the conveyor, and is then transferred to the conveyor by movement of a plow or transfer device in either direction beneath the hopper bottom. By this arrangement, bulk cargo can be unloaded rapidly and with a minimum amount of breakage of the material. It will be noted, furthermore, that the transfer device may be operated back and forth for the full length of the cargo space if the cargo consists of one kind of material, or may be operated selectively under any one of the holds for the purpose of separately handling materials forming a mixed cargo, or for other purposes, such as properly trimming the vessel during the unloading operation.

While I have illustrated and described the self-unloading vessel of my invention in a detailed manner, it should be understood, however, that I do not intend to limit myself to the precise details of construction and arrangements of parts illustrated and described, but regard my invention as including such changes and modifications as do not involve a departure from the spirit of the invention and the scope of the appended claims.

Having thus described my invention, I claim:

1. In a self-unloading vessel, the combination of a cargo hold having a hopper bottom with a plurality of discharge openings and a longitudinally extending ridge, a tunnel beneath said ridge, a conveyor extending longitudinally in said tunnel, means extending near said openings for supporting material discharged therethrough in substantially a condition of repose adjacent said conveyor, a scraping device having an angularly disposed deflecting portion, and means for moving said scraping device along said tunnel for deflecting the material laterally of said supporting means onto said conveyor.

2. In a self-unloading vessel, the combination of a cargo hold having a hopper bottom with a plurality of discharge openings and a longitudinally extending ridge, a tunnel beneath said ridge, a conveyor in said tunnel, means extending near said openings for supporting material discharged therethrough in substantially a condition of repose adjacent said conveyor, and means for transferring the discharged material from said supporting means onto said conveyor, said transfer means comprising a carriage adapted to be moved in opposite directions in said tunnel and deflecting means on said carriage for deflecting material from said supporting means onto said conveyor during movement of the carriage.

3. In a self-unloading vessel, the combination of a hopper-bottomed cargo hold having a discharge tunnel beneath the same, a conveyor extending longitudinally of said tunnel, said hold having discharge openings through the bottom thereof for spilling material upon the floor of said tunnel adjacent said conveyor, and a scraping device adapted to be moved longitudinally through said tunnel and to displace spilled material from the tunnel floor onto said conveyor during such longitudinal movement.

4. In a self-unloading vessel, the combination of a hopper-bottomed cargo hold having a discharge tunnel beneath the same, a conveyor extending longitudinally of said tunnel, said hold having discharge openings through the bottom thereof leading into said tunnel, shelves extending longitudinally adjacent said openings for supporting material discharged therethrough, said shelves being disposed above the level of said conveyor with their adjacent edges overhanging the latter, and a scraping device adapted to be moved longitudinally within said tunnel and to displace spilled material from said shelves onto said conveyor during such longitudinal movement.

5. In a self-unloading vessel, the combination of a hopper-bottomed cargo hold having a discharge tunnel beneath the same, said tunnel being provided with a floor having a recess therein extending longitudinally of the vessel, a conveyor in said recess, said hold having discharge openings through the bottom thereof for spilling material upon the floor of the tunnel adjacent said conveyor, and a scraping device adapted to travel longitudinally through said tunnel and to displace spilled material from the tunnel floor onto said conveyor during such longitudinal travel.

6. In a self-unloading vessel, the combination of a cargo hold having a hopper bottom with a plurality of discharge openings and a longitudinally extending ridge, a tunnel beneath said ridge, a conveyor in said tunnel, means extending near said openings for supporting material discharged therethrough in substantially a condition of repose adjacent said conveyor, and a plow adapted to be moved along said tunnel for transferring the material from said supporting means onto said conveyor.

7. In a self-unloading vessel, the combination of a cargo hold having a hopper bottom with a plurality of discharge openings and a longitudinally extending ridge, a tunnel beneath said ridge, a conveyor in said tunnel, means extending near said openings for supporting material discharged therethrough in substantially a condition of repose adjacent said conveyor, and a plow for transferring the discharged material from said supporting means onto said conveyor, said plow being adapted to be selectively moved in opposite directions in said tunnel and to transfer material from said supporting means to said conveyor during its movement in both directions.

8. In a self-unloading vessel, the combination of a cargo hold having a hopper bottom provided with a longitudinally extending ridge and a series of discharge openings on each side thereof, a tunnel beneath said ridge, a conveyor in said tunnel, means extending near said openings for supporting material discharged therethrough in substantially a condition of repose adjacent said conveyor, a track in said tunnel, a carriage adapted to be moved along said track, and means on said carriage for transferring material from said supporting means to said conveyor.

9. In a self-unloading vessel, the combination of a cargo hold having a hopper bottom provided with a longitudinally extending ridge and a series of discharge openings on each side thereof, a tunnel beneath said ridge, a conveyor in said tunnel, means extending near said openings for supporting material discharged therethrough in substantially a condition of repose adjacent said conveyor, a track in said tunnel, a carriage adapted to be moved along said track, and deflecting means movable with said carriage for transferring material from said supporting means to said conveyor.

10. In a self-unloading vessel, the combination of a cargo hold having a hopper bottom provided with a longitudinally extending ridge and a series of discharge openings on each side thereof, a tunnel beneath said ridge, a conveyor in said tunnel, means extending near said openings for supporting material discharged therethrough in substantially a condition of repose adjacent said conveyor, a track in said tunnel, a carriage adapted to be selectively moved in opposite directions along said track, and means on said carriage for transferring material from said supporting means to said conveyor upon movement of the carriage in either direction.

11. In a self-unloading vessel, the combination of a cargo hold having a hopper bottom provided with a longitudinally extending ridge and a series of discharge openings on each side thereof, a tunnel beneath said ridge, a conveyor in said tunnel, means extending near said openings for supporting material discharged therethrough in substantially a condition of repose adjacent said conveyor, a track in said tunnel, a carriage adapted to be moved in opposite directions along said track, and deflecting means movable with said carriage for transferring material from said supporting means to said conveyor upon travel of the carriage in either direction.

12. In a self-unloading vessel, the combination of a cargo hold having a hopper bottom provided with a longitudinally extending ridge and a series of discharge openings on each side thereof, a tunnel beneath said ridge, a conveyor in said tunnel, means extending near said openings for supporting material discharged therethrough in substantially a condition of repose adjacent said conveyor, and a transfer device for displacing material from said supporting means substantially laterally onto said conveyor, said device comprising a shoe element, and a deflecting plate extending from said shoe element toward said conveyor at an angle which is oblique to the latter.

13. In a self-unloading vessel, the combination of a cargo hold having a hopper bottom provided with a longitudinally extending ridge and a series of discharge openings on each side thereof, a tunnel beneath said ridge, a conveyor in said tunnel, means extending near said openings for supporting material discharged therethrough in substantially a condition of repose adjacent said conveyor, and a transfer device for displacing material from said supporting means onto said conveyor, said device comprising a carriage adapted to be selectively moved in either direction along said tunnel, and a deflecting member carried thereby, said deflecting member being fulcrumed on said carriage and adapted to assume a position oblique to the axis of said conveyor upon movement of said carriage in one direction and to assume a substantially opposite oblique position upon movement of said carriage in the opposite direction.

14. In a self-unloading vessel, the combination of a cargo hold having a hopper bottom provided with a longitudinally extending ridge and a series of discharge openings on each side thereof, a tunnel beneath said ridge, a conveyor in said tunnel, means extending longitudinally near each series of openings for supporting material adjacent to and on each side of said conveyor, and means for transferring material from said supporting means to said conveyor, said means comprising a carriage adapted to be moved selectively in either direction along said tunnel, a pair of deflecting members on said carriage, and means for positioning said members obliquely to said conveyor for the transfer of material to the latter upon movement of said carriage in either direction.

In testimony whereof, I hereunto affix my signature.

CHARLES H. BRADLEY.